Oct. 14, 1952 — N. C. PRICE — 2,613,749
GAS TURBINE POWER PLANT HAVING PROPELLER DRIVE
Filed Aug. 14, 1948 — 4 Sheets-Sheet 1
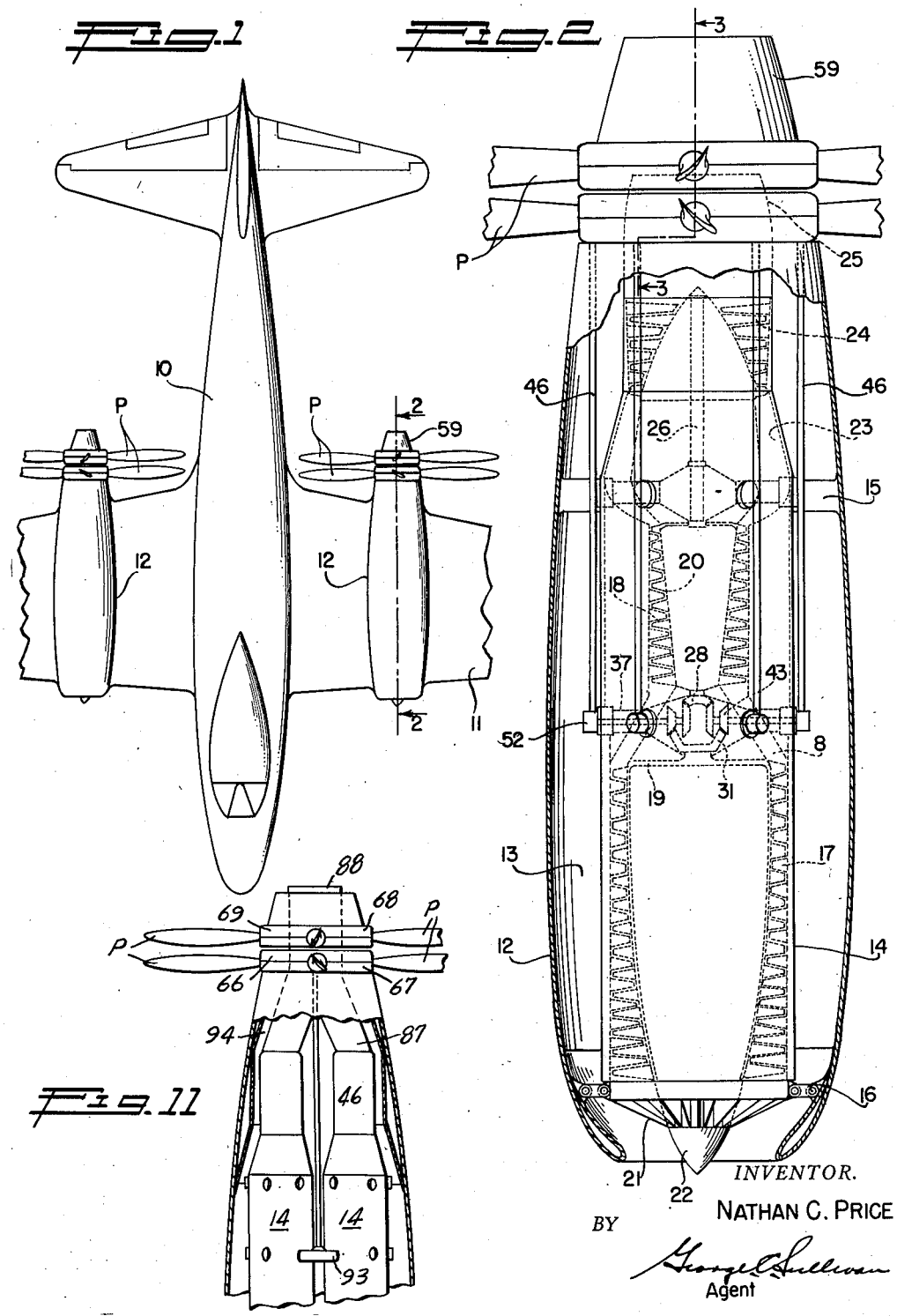
INVENTOR.
NATHAN C. PRICE
BY George C. Sullivan
Agent

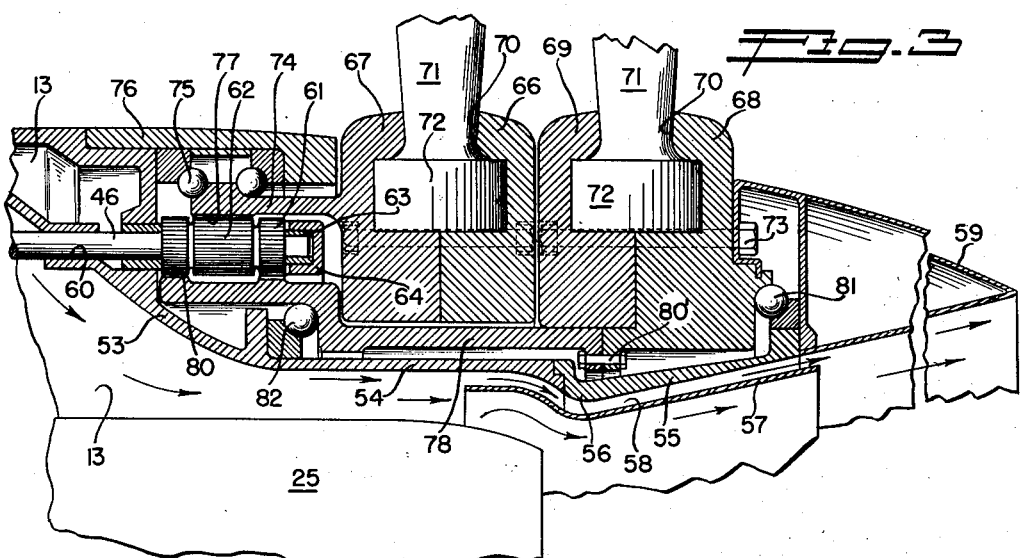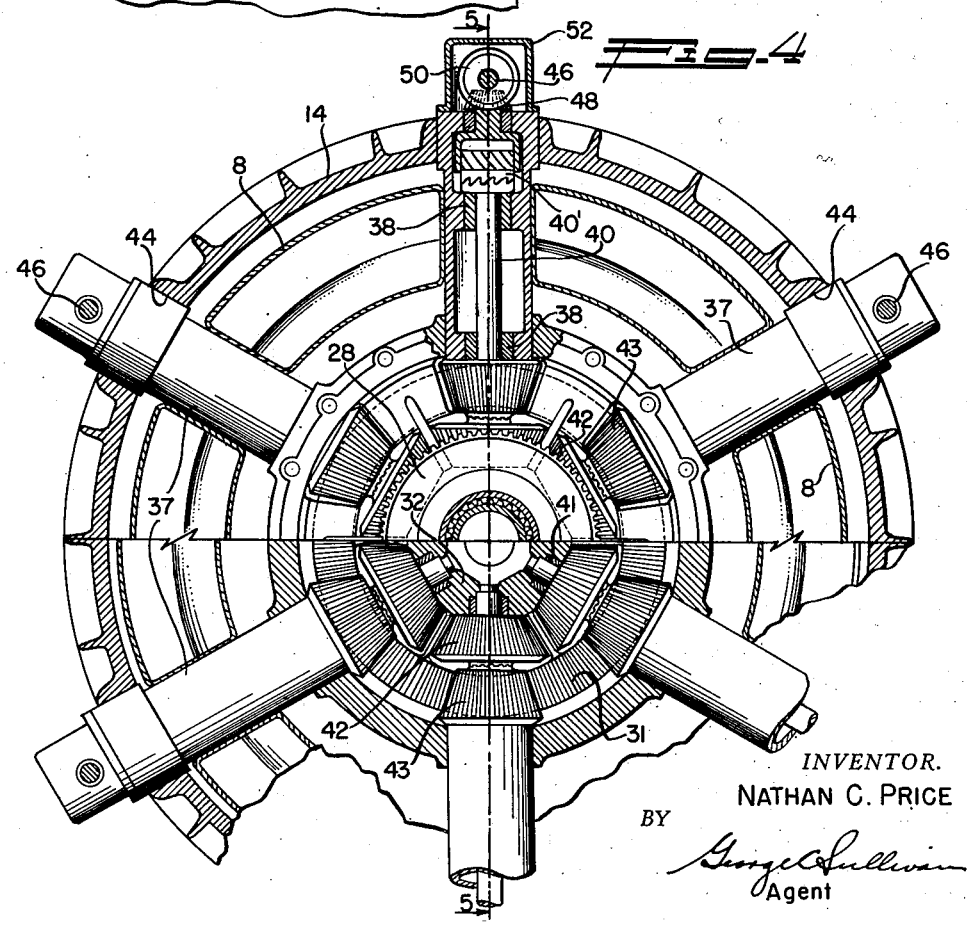

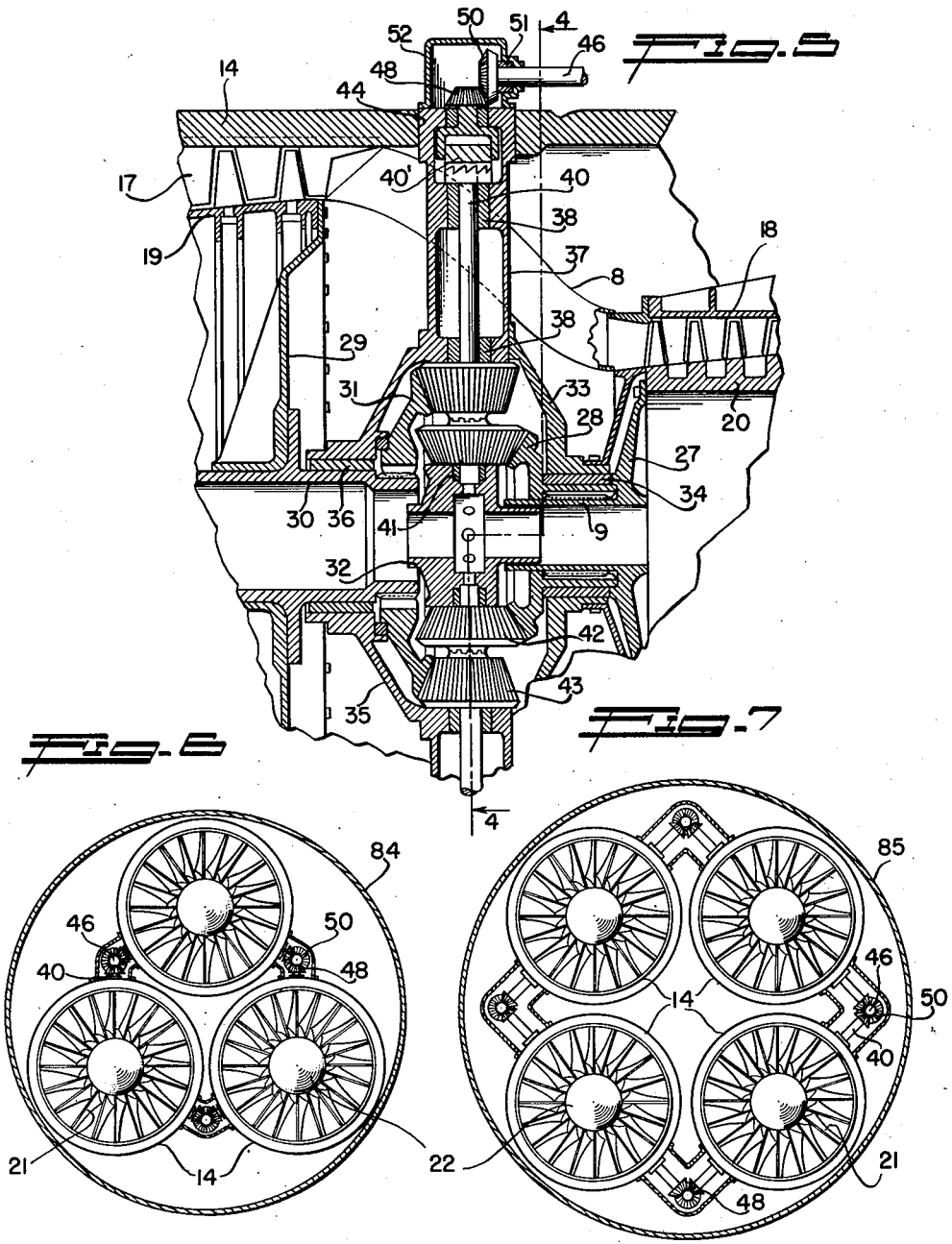

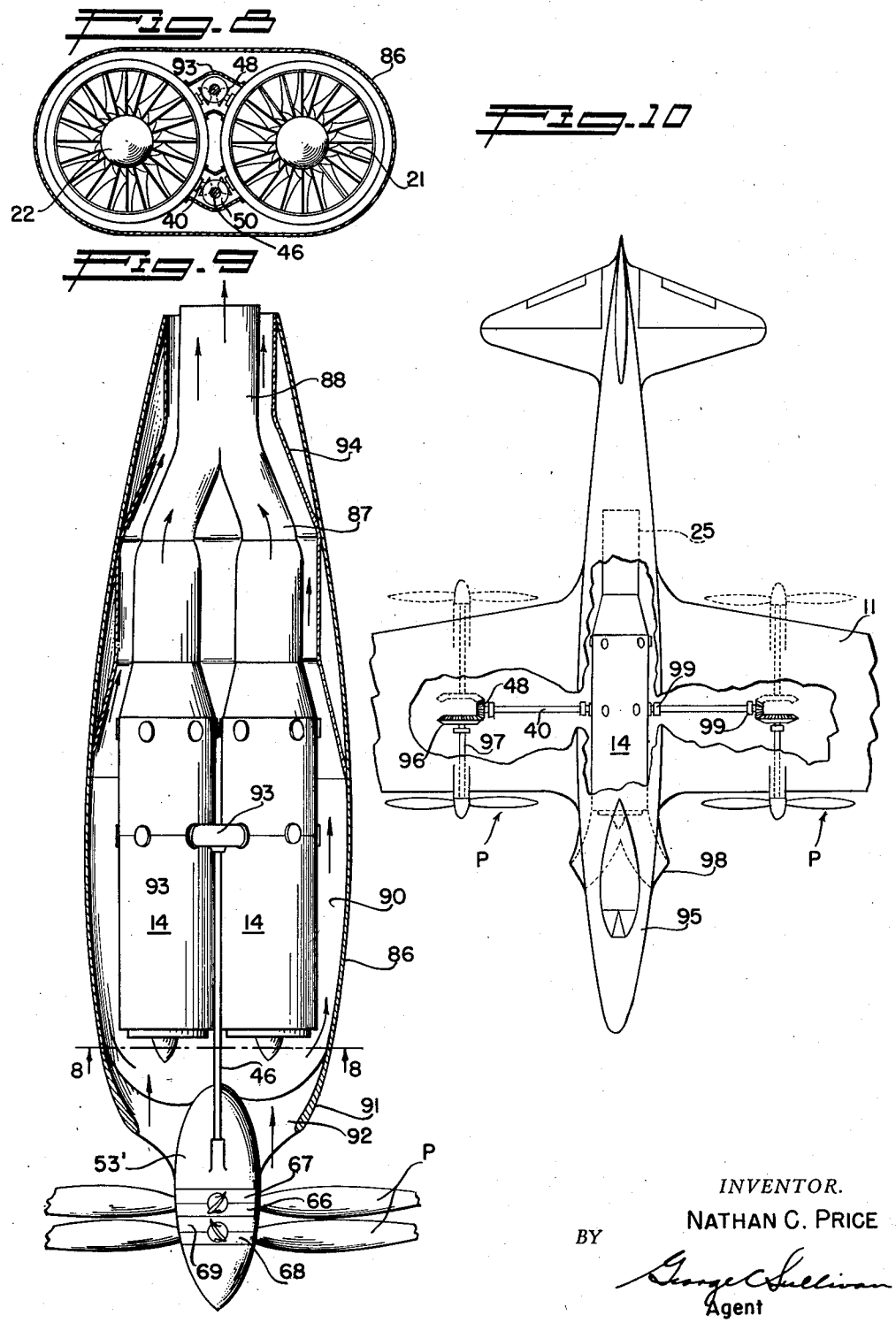

Patented Oct. 14, 1952

2,613,749

UNITED STATES PATENT OFFICE 2,613,749

GAS TURBINE POWER PLANT HAVING PROPELLER DRIVE

Nathan C. Price, St. Helena, Calif., assignor to Lockheed Aircraft Corporation, Burbank, Calif.

Application August 14, 1948, Serial No. 44,248

15 Claims. (Cl. 170—135.28)

This invention relates to the propulsion of aircraft and relates more particularly to the utilization of internal combustion turbine powerplants for the driving of propulsive blading or propellers.

The present invention is concerned with turbine type powerplants for aircraft and comprehends the employment of high speed shafts driven by a turbine and arranged to drive propellers so that a substantial or large proportion of the output is exerted in the form of a reactive propulsive jet. It is an object of the present invention to provide a powerplant of this class characterized by a multiplicity of radial drives for transmitting power from the turbine shaft, or compressor rotor driven thereby, to a multiplicity of high speed high load capacity external shafts which may be located and arranged in advantageous manners to drive the propellers. The high speed radially positioned or extending power take-off shafts permit of greatly varied and desirable powerplant installations, for example single or multiple engine installations for driving either tractor or pusher type propellers aligned with or offset from the powerplant. The radial drives are so related that they may drive symmetrically arranged axially extending lay shafts at the exterior of the powerplant and passing either forwardly or rearwardly to the propeller assemblies. The radial output shafts are also positioned so that corresponding or related radial shafts of multiple adjacent powerplants may jointly drive common axially positioned lay shafts extending to the propeller driving mechanisms.

Another object of the invention is to provide a powerplant of the class referred to wherein the mechanism for driving the propeller or propellers does not in any way obstruct, restrict or interfere with either the ram inlet passage or the passage of the propulsive nozzle. The radial shafts extend to the exterior of the powerplant where they connect with the axial shafts which in turn drive the propeller or propellers. In the tractor type of installation the propeller may surround the ram inlet of the engine and in the pusher type of installation the propeller may surround the nozzle portion of the powerplant. In the engine of the invention no exhaust turbine is required to drive the propeller and there is no other instrumentality taking power from or obstructing the stream of gases exhausting from the turbine so that a substantial proportion of the aggregate propulsive thrust obtained is produced by the reaction of the jet gases.

A further object of the invention is to provide an aircraft powerplant of the type referred to in which the radial shafts for transmitting power to the propeller drives constitute elements of the speed reduction gearing between the first and second stage compressors of the turbo powerplant proper. This greatly simplifies the construction and reduces the cost of manufacture, the radial shafts serving to carry the cluster pinions of the speed reduction gear set and extensions or continuations of the shafts being connected through bevel gears, or the like, with the external lay shafts which extend axially to the propeller assemblies. The speed reduction gearing between the first and second stage compressors may be designed to obtain any selected or required speed ratio between the compressors and the inclusion or provision of the radial power take-off means for driving the propellers does not in any way interfere with or complicate the transmission of power to the compressors.

Other features and objectives of the invention will become apparent from the following detailed description of several typical preferred embodiments throughout which reference is made to the accompanying drawings wherein:

Figure 1 is an elevational view of an airplane embodying a powerplant installation of the invention;

Figure 2 is an enlarged vertical sectional view taken as indicated by line 2—2 on Figure 1, with the powerplant appearing in side elevation;

Figure 3 is an enlarged fragmentary detailed sectional view taken substantially as indicated by line 3—3 of Figure 2;

Figure 4 is a fragmentary vertical detailed sectional view taken substantially as indicated by line 4—4 on Figure 5;

Figure 5 is a fragmentary detailed sectional view taken as indicated by line 5—5 on Figure 4;

Figures 6, 7 and 8 are more or less diagrammatic front elevational views of multiple powerplant installations of the invention;

Figure 9 is a somewhat reduced horizontal sectional view of the installation shown in Figure 8 with the powerplants appearing in elevation;

Figure 10 is a fragmentary elevational view of an airplane embodying lateral or offset propeller drives of the invention with portions broken away to show the powerplant and drives in elevation; and Figure 11 is a fragmentary view similar to Figure 9 showing pusher-type propellers.

Figures 1 to 5 inclusive of the drawings illustrate the invention embodied in a powerplant for driving counter-rotating pusher type propellers P. As shown in Figure 1, an airplane 10 has two powerplants of the invention submerged in the wings 11, or housed in nacelles 12. As will later become more apparent, the nacelles 12 are in the nature of shrouds for the powerplants and serve to define or leave passages 13 for cooling air. The nacelles 12 have open forward ends slightly in advance of the leading edges of the wings 11 and extend beyond the trailing edges of the wings so that the pusher type propellers P are beyond the wings. In this particular application of the invention there is but one powerplant in each nacelle or shroud 12. The powerplants are arranged coaxially in the nacelle shrouds 12 to have their housings or casings 14 spaced inwardly from the shrouds, leaving the annular air passages 13. Mounting pads or struts 15 support the intermediate or rear portions of the powerplants in the shrouds 12 while pivoted links 16 mount the forward ends of the powerplants in the shrouds in a manner to allow for relative thermal expansion and contraction of the nacelles and powerplants. The leading ends of the tubular nacelles or shrouds 12 flare or diverge rearwardly to form diffuser ram inlets.

Each powerplant includes a first stage axial flow compressor 17 in the forward portion of the casing 14 and a second stage axial flow compressor 18 arranged in the casing behind the compressor 17. The rotors 19 and 20 of the compressors 17 and 18, respectively, are coaxial and carry pluralities of rows of impeller blades operating between rows of stator blades on the wall of the casing structure. The forward end of the casing 14 is open in the inlet of the shroud 12 to form a ram inlet for the first stage compressor 17 and pitched radial vanes 21 are provided in the casing inlet to impart an initial spiral motion to the air counter to the direction of rotation of the rotor 19. The vanes 21 further serve to support the forward hub 22 of the compressor. Ducts 8 carry compressed air from the high pressure end of the first stage compressor 17 to the inlet of the second stage compressor 18. The second stage compressor 18 in turn discharges into an annular combustion chamber 23.

A suitable fuel is supplied to the combustion chamber 23 and is consumed therein in accordance with the usual practice in the operation of internal combustion turboengines. The hot compressed air and combustion gases are discharged from the chamber 23 into a turbine 24 which is illustrated as being of the multi-stage type. The turbine 24 in turn discharges the air and gases through a propulsive nozzle 25 to take the form of a reactive propulsive jet which materially aids in the propulsion of the aircraft. The nozzle 25 may be of any selected or suitable type. The shaft 26 of the turbine 24 extends forwardly and connects with the rotor 20 of the second stage compressor 18 to drive the same. In this connection it will be observed that the second stage compressor 18 is directly driven by the turbine 24.

The transmission or drive between the first and second stage compressors 17 and 18 includes a diaphragm or plate 27 secured to the forward end of the second stage compressor rotor 20 and provided with a shaft 9 to which is splined a beveled drive pinion 28; see Figure 5. A somewhat similar plate 29 on the rear end of the first stage compressor rotor 19 is attached to the rotor shaft 30 and a driven bevel gear 31 of larger diameter than the driving gear 28 is splined on the shaft 30. A central spider 32 is arranged ahead of the driving gear 28 and is connected with a diaphragm plate 33 which carries a bearing 34 for the shaft 9 and pinion 28. A somewhat similar plate 35 carries a bearing 36 for the shaft 30 of the first stage compressor rotor 19. The two diaphragms or plates 33 and 35 are spaced apart to accommodate the gearing and the assembly carries a plurality of circumferentially spaced radial arms 37. The arms 37 are tubular and extend outwardly to have their outer ends received in openings 44 in the wall of the engine casing 14. A radial shaft 40 extends through each arm 37 and is supported therein by spaced bearings 38. The shafts 40 may include overrunning clutches 40' at an intermediate portion of their length, so that when several powerplants are arranged to drive a propeller, one or more of these powerplants may be used for standby purposes. The inner ends of the shafts 40 may be supported in bearings 41 carried by the spider 32. Each shaft 40 has a pair or cluster of pinions 42 and 43 fixed thereon. The pinions 42 mesh with the driving gear 28 while the pinions 43 are in meshing engagement with the larger diametered driven gear 31. The several gears and pinions of the gear set are preferably of the spiral bevel type although they may be simple bevel gears as illustrated. It will be observed that with the arrangement just described there may be a selected or desired speed ratio between the rotors 19 and 20 of the first and second stage compressors 17 and 18. While the number of radial shafts 40 employed may be varied I prefer to incorporate six equally spaced shafts 40 in the transmission as illustrated in Figure 4. My copending application Serial Number 433,599, filed March 6, 1942, now Patent No. 2,540,991, issued February 6, 1951, discloses a gas turbine power plant embodying a transmission between compressor stages which incorporates radial auxiliary shafts for driving auxiliaries and my copending application Serial Number 572,924, filed January 15, 1945, now Patent No. 2,514,513, issued July 11, 1950, discloses a similar construction wherein the radial shafts drive boundary layer fans.

In accordance with the invention the shafts 40, or at least certain of the shafts 40, are utilized to drive axially extending lay shafts 46 which, in turn, extend to the propeller means to drive the same. Pinions or gears 48 are secured to the outer ends of the radial shafts 40 and mesh with gears 50 secured on the shafts 46. Where the propellers P are located at the aft end of the powerplant, as shown in Figures 1, 2 and 3, the lay shafts 46 extend rearwardly from adjacent the radial shafts 40 to adjacent the rear end of the powerplant. In this case the gears 50 are secured to the forward ends of the shafts 46 and the sets or pairs of meshing gears 48 and 50 are bevel gears. As best shown in Figure 2, the shafts 46 are arranged at the exterior of the powerplant casing 14 and extend through the air passage 13 in substantially parallel relation to the longitudinal axis of the engine. Suitable axially spaced bearings 51 carry the high speed lay shafts 46 and boxes or housings 52 enclose the pairs of gears 48 and 50.

The particular mechanism employed to transmit rotation from the high speed lay shafts 46 to the propeller or propellers P will, of necessity, be varied according to the location of the propeller or propellers, the nature of the propellers, and upon whether single or multiple propellers are to be driven. In the application of the invention illustrated in Figures 1 to 5 inclusive, a pair of counter-rotating propellers P is arranged to surround the aft portion of the shroud or nacelle 12. The rear part of the shroud 12 is equipped with an annular mounting or supporting member 53 for carrying the propeller hubs, etc. The member 53 forms a rearwardly continuing extension of the shroud 12 and surrounds the nozzle portion 25 of the powerplant with clearance so that the above described air passage 13 continues rearwardly around the nozzle. However, the forward portion of the member 53 is gradually reduced in both internal and external diameter so that the passage 13 is restricted and the member 53 has a cylindrical part 54 continuing rearwardly in surrounding relation to the exit of the nozzle 25. The rear part 55 of the supporting member 53, which is slightly aft of the nozzle exit flares or diverges rearwardly from a suitably rounded or curved point 56 of minimum internal diameter. A protective annular baffle 57 of heat resistant material is spaced within the intermediate and rear portions of the member 53 to protect the member against the action of the hot gases discharged from the nozzle 25 and to leave or provide an annular passage 58 for cooling air. Air from the main shroud passage 13 flows through the cooling passage 58 to insulate and protect the member 53 and this air discharges from the rear end of the passage 58 to mingle with the main stream or jet of discharging gases and air. A cowl 59 presenting a rearwardly divergent inner wall extends from the rear end of the member 53 to form a continuation of the divergent passage defined by the above described portion 55. It will be seen that with the construction just described the rammed air received at the forward end of the annular passage 13 discharges from the rear end of the passage to mingle with the stream of gases issuing from the nozzle 25 and thus materially augments the mass of the reactive propulsive jet to increase the thrust.

The above described lay shafts 46 pass rearwardly through openings 60 in the wall of the converging forward portion of the member 53 and each shaft carries on its end part a pair of spaced pinions 61 and a pinion 62 located between said spaced pinions. Bearings 63 carried by a cage 64 mounted in the member 53 support the rear extremities of the shafts 46 adjacent the pinions. The hubs for the two propellers P surround the member 53 and are driven by the shafts 46 to rotate in opposite directions. One hub includes a pair of engaging complementary rings 66 and 67 and the other hub comprises a pair of similar complementary rings 68 and 69. The pairs of hub rings 66 and 67 and 68 and 69 have radial openings 70 receiving the shanks of the propeller blades 71 and these openings are enlarged at their inner portions to accommodate heads 72 on the blades so as to lock or secure the blades to the hubs. Bolts 73 clamp the pairs of rings 66 and 67 and 68 and 69 together on their respective sets of propeller blades 71.

The hub ring 67 of the forward propeller P has a forwardly projecting annular flange 74 and spaced anti-friction bearings 75 cooperate with the flange to support the forward propeller for free rotation. The bearings 75 are of the combined radial and axial thrust type and are supported by an annular part 76 on the member 53 so as to engage around the flange 74. The inner side or interior of the flange 74, substantially opposite the bearings 75, is in the nature of an internal ring gear 77 which meshes with the pinions 62 of the several shafts 46. It will be seen that the lay shafts 46, driven by the turbine 24 as above described, serve to drive the forward propeller P through the medium of the pinions 62 and gear 77.

The drive for the aft propeller P includes a hollow or tubular shaft 78 secured to the hub ring 68 of the aft propeller at a bolted flange connection 80'. The shaft 78 extends forwardly through the hub rings 66 and 67 in spaced relation to both the rings and the member 53 and the shaft 78 has an outwardly offset straddle type gear 80 on its forward end. An anti-friction bearing 81 cooperates with the hub ring 68 and a similar bearing 82 cooperates with the shaft 78 to mount the aft propeller on the member 53. The bearings 81 and 82 are constructed and arranged to assume both radial and axial thrusts or loads. Since the torque absorbed by the forward propeller is approximately the same as that of the aft propeller, the net tangential force at the pinion bearings 63 is approximately zero with the straddle arrangement of gear meshes as shown, hence bearing frictional losses are at a minimum.

It is believed that the operation of the powerplant arrangement illustrated in Figures 1 to 5 inclusive will be readily understood from the foregoing detailed description. With the engine in operation the first and second stage axial flow compressors 17 and 18 are driven by the turbine 24 to supply compressed air to the combustion chamber 23. The multi-blading row compressors provide a high ratio of compression and the compressed air is heated in the combustion chamber 23 to discharge into the turbine 24 at a high temperature and a substantial velocity to drive the turbine. As previously described the hot gases and air discharge from the nozzle 25 at a high velocity to form an efficient propulsive jet which is augmented by the air supplied and induced through the passage 13. The augmenter air flowing through the passage 13 cools the exterior of the case 14 of the powerplant, thermally insulates the powerplant from the shroud and adjacent parts of the aircraft and cools and protects the propeller hub assembly. The radial shafts 49 of the transmission or drive connecting the first and second stage compressors 17 and 18 serve to drive the lay shafts 46 through the gears 48 and 50 and the shafts 46 in turn drive the counter-rotating propellers P through the gearing 62—77 and 61—80. Thus the powerplant serves to drive the propellers P and produces the reactive thrust providing jet. In practice a substantial proportion of the aggregate propulsive thrust is produced by the reactive jet, for example from 30 to 60 per cent of the thrust is provided by the reactive jet, the exact value depending upon the requirements of the particular aircraft installation. It will be observed that the powerplant presents a minimum frontal area and may be effectively "submerged" or housed in a wing, fuselage, or the like. The propellers P are driven without resorting to the use of an exhaust type turbine, or the like, and there are no obstructions to the flow of the working fluid through the powerplant.

Figures 6 to 9 inclusive of the drawings illustrate typical multi-unit installations, there being three powerplants embodied in the arrangement of Figure 6, four powerplants shown in Figure 7, and two engines in the installation illustrated in Figures 8 and 9. The powerplants of these installations are preferably arranged in adjacent parallel relation and are symmetrically positioned with respect to a common axis. Thus in Figure 6 the three powerplants are arranged so that their casings 14 are equally spaced about the central longitudinal axis of an enclosing shroud 84 which corresponds in function to the shroud 12 described above and in Figure 7 the four engines are uniformly spaced about the central longitudinal axis of a similar shroud 85. In these installations the angular positions of the powerplants are such that at least two of the radial shafts 40 of each powerplant carry pinions 48 which mesh with gears 50 of axial lay shafts 46 which gears 50 are engaged by the pinions 48 on the shafts 40 of adjacent powerplants. This relationship is clearly illustrated in Figures 6, 7 and 8. The axial lay shafts 46 driven in this manner may extend rearwardly to the ring gears 77 and 80 of the propeller driving mechanism as described above and as shown in Figures 2 and 3, or the shafts 46 may extend forwardly to the propeller driving mechanism as illustrated in Figure 9.

In Figures 8 and 9 the two powerplants are within a tubular shroud 86 of elongated transverse cross section and are arranged so that each powerplant has two radial shafts 40 driving lay shafts 46 through the gears 48 and 50, each shaft 46 being driven by a radial shaft 40 of each engine. In the multiple powerplant installations the hot gases and air discharged by the turbines 25 may pass through pipes 87 which in turn empty into a common nozzle 88 as shown in Figure 9. The shroud 86 is spaced around the powerplant to leave a passage 90 for the cooling and jet augmenting air and the passage 90 has its outlet in adjacent surrounding relation to the nozzle 88 to effect the augmenter action. The forward end of the shroud 86 has a divergent ram inlet 91 and streamlined radial vanes 92 in the inlet carry a central member 53' corresponding in function to the above described member 53. The axial shafts 46 extend into the member 53' to drive the propeller hub rings 66—67 and 68—70 through the gears 62—77 and 61—80 as described above. It will be readily understood how this tractor propeller drive may be employed in the powerplant installations shown in Figures 1 to 5 inclusive and Figures 6 and 7.

In the powerplant installation of Figures 8 and 9, the gears 48 and 50 on the shafts 40 and 46 are enclosed in housings 93 suitably attached to the casings 14 of the engines. As illustrated in Figure 9 a tubular baffle or liner 94 may be installed in the rear portion of the shroud 86 to direct the air flowing through the passage 90 against the combustion chamber and turbine portions of the powerplant and against the pipes 87 and 88. The liner 94 is shaped to follow generally the external configuration of these parts but is spaced therefrom to leave a sufficient passage for the flow of the cooling and augmenter air.

Figure 10 illustrates an installation of the invention in which a turbopowerplant of the character above described drives one or more laterally positioned or offset propellers P. In the particular case illustrated, the powerplant is arranged with its casing 14 mounted axially in the fuselage 95 of the airplane and one or more air intake ducts 98 extend from the forward portion of the fuselage to the inlet of the first stage compressor 17. In this type of installation the fuselage 95, or parts therein, form a shroud which is in spaced surrounding relation to the powerplant. The propulsive nozzle 25 of the engine discharges rearwardly from the aft portion of the fuselage 95. I have shown two diametrically opposite or aligned radial shafts 40 of the engine extending laterally into the wings 11 and the outer ends of these shafts are provided with the bevel gears 48. Spaced bearing means 99 support the shafts 40 which may be of considerable length. The gears 48 mesh with pinions or gears 96 fixed on shafts 97 extending chordwise or generally parallel with the longitudinal axis of the powerplant. The shafts 97 may extend from either the leading edges of the wings 11 as shown in the full lines or from the trailing edges of the wings as indicated by the broken lines, to support and drive the propellers P. Thus the turbopowerplant may drive one or more laterally offset propellers of either the tractor or pusher type. It will be observed that in the installation of Figure 10, the powerplant is substantially entirely contained or housed within the airframe structure where it offers practically no drag, having no frontal area exposed in the air stream.

Having described only typical forms of the invention I do not wish to be limited to the specific details herein set forth, but wish to reserve to myself any variations or modifications that may appear to those skilled in the art and fall within the scope of the following claims.

I claim:

1. An aircraft powerplant comprising, a turbine, a first stage compressor, a second stage compressor driven by the turbine, a combustion chamber receiving compressed air from the compressors and supplying hot gases and air to the turbine to drive the same, a speed reducing drive between the first and second stage compressors, said drive including at least one rotating shaft extending laterally with respect to the compressors, a propeller, and a drive between the shaft and propeller.

2. In combination with a turbopowerplant having a casing containing a turbine, a combustion chamber and compressor means driven by the turbine; a transmission driven by the compressor means and including shafts extending laterally with respect to the rotational axis of the compressor means to the exterior of said casing, a propeller at the forward end of the casing, shafts geared to the first named shafts and extending forwardly at the exterior of the casing, and a drive between the second named shafts and the propeller.

3. In combination with a turbopowerplant having a casing containing a turbine, a combustion chamber and compressor means driven by the turbine; a transmission driven by the compressor means and including shafts extending laterally with respect to the rotational axis of the compressor means to the exterior of said casing, a propeller at the aft end of the casing, shafts geared to the first named shafts to be driven thereby and extending rearwardly therefrom at the exterior of the casing, and a drive mechanism between the second named shafts and the propeller for driving the latter.

4. In combination with a turbopowerplant having a casing provided with a propulsive nozzle and containing a gas turbine discharging gases from the nozzle, a combustion chamber and compressor means driven by the turbine; shafts driven by the compressor means and extending laterally from the casing, shafts geared to the first named shafts and extending rearwardly at the exterior of the casing, and propeller means surrounding the nozzle and driven by the second named shafts.

5. In combination with a turbopowerplant having a casing provided with a propulsive nozzle and containing a gas turbine discharging gases from the nozzle, a combustion chamber and compressor means driven by the turbine; shafts driven by the compressor means and extending laterally from the casing, shafts geared to the first named shafts and extending rearwardly at the exterior of the casing, a pair of propellers surrounding the nozzle, and means driven by the second named shafts for rotating the propellers in the opposite directions.

6. In combination with a turbopowerplant having a casing provided with a propulsive nozzle and containing a gas turbine discharging gases from the nozzle, a combustion chamber and compressor means driven by the turbine; shafts driven by the compressor means and extending laterally from the casing, a tubular shroud spaced around the casing to leave an air passage having an exit adjacent said nozzle, shafts geared with the first named shafts and extending rearwardly therefrom in said passage, and propeller means carried by the shroud to surround the nozzle and driven by the second named shafts.

7. In combination with a turbopowerplant having a casing provided with a propulsive nozzle and containing a gas turbine discharging gases from the nozzle, a combustion chamber and compressor means driven by the turbine; shafts driven by the compressor means and extending laterally from the casing, a tubular shroud spaced around the casing to leave an air passage having a ram inlet at its forward end and an exit adjacent said nozzle, shafts geared with the first named shafts and extending rearwardly in said passage, a propeller, means on the shroud around the rear end of said passage for mounting the propeller, and a drive from the second named shaft to said propeller.

8. In a powerplant having a casing containing a gas turbine, a combustion chamber and compressor means driven by the turbine, and having a shroud spaced around the casing to leave an air passage, the shroud being provided with a forward ram inlet; the combination of shafts driven from the compressor means and extending laterally from the casing, propeller means mounted on said shroud adjacent said inlet, and shafts geared with the first named shafts and extending forwardly therefrom to drive the propeller means.

9. In a powerplant having a casing containing a gas turbine, a combustion chamber and compressor means driven by the turbine, and having a shroud spaced around the casing to leave an air passage, the shroud being provided with a forward ram inlet; the combination of shafts driven from the compressor means and extending laterally from the casing, propeller means mounted ahead of said inlet, and shafts geared to the first named shafts and extending forwardly therefrom through said passage to drive the propeller means.

10. Propulsion means for aircraft comprising a tubular shroud having an air inlet at its forward end and an air exit at its rear end, propeller means at one of said ends of the shroud, a plurality of turboplants spaced within the shroud to leave an air passage therethrough each including a gas-discharging outlet and a plurality of drive shafts, a nozzle receiving the gases from said outlets and discharging the same in the form of a propulsive jet adjacent said exit of the shroud, and a drive from said shafts to the propeller means to drive the same.

11. Propulsion means for aircraft comprising a tubular shroud having an air inlet at its forward end and an air exit at its rear end, propeller means at one of said ends of the shroud, a plurality of turboplants arranged in spaced side by side relation within the shroud to leave an air passage therethrough each including a gas-discharging outlet, and a plurality of spaced laterally projecting drive shafts, the turboplants being positioned and related so that the outer ends of the drive shafts of one turboplant are adjacent the outer ends of the drive shafts of the other turboplant, nozzle means receiving the gases from said outlets and discharging the same adjacent said exit in the form of a propulsive jet, shafts extending axially at the exterior of said plants, pinions on said outer ends of the drive shafts, a gear on an end of each axially extending shaft meshing with the pinions on said adjacent ends of at least two of said drive shafts, and means for driving the propeller means from the axially extending shafts.

12. Propulsion means for aircraft comprising a tubular shroud having an air inlet at its forward end and an air exit at its rear end, propeller means at one of said ends of the shroud, a plurality of turboplants spaced within the shroud to leave an air passage therethrough each including a gas-discharging outlet, and a plurality of spaced drive shafts extending laterally from the turboplant, nozzle means receiving the gases from said outlets and discharging the same adjacent said exit in the form of a propulsive jet, shafts extending axially at the exterior of said plants, pinions on said drive shafts, gears on the axially extending shafts meshing with said pinions, the gears on each axially extending shaft meshing with the pinions on the lateral shafts of at least two adjacent powerplants, and means for driving the propeller means from the axially extending shafts.

13. Propulsion means for aircraft comprising a plurality of internal combustion turbine powerplants each including an outlet for hot gases under pressure and a plurality of circumferentially spaced power shafts, the power shafts extending substantially radially with respect to the longitudinal axes of their respective power plants, gears fixed on the power shafts, shafts extending axially at the exteriors of the powerplant, and a gear fixed on each axial shaft and meshing with the gears on the power shafts of adjacent powerplants, a propeller, and a drive between said axial shafts and the propeller.

14. Propulsion means for aircraft comprising a plurality of internal combustion turbine powerplants each including an outlet for hot gases under pressure and a plurality of circumferentially spaced power shafts, the power shafts extending substantially radially with respect to the longitudinal axes of their respective power plants, nozzle means receiving the gases from said outlets and discharging the same in the form of a propulsive jet, gears fixed on the power shafts, shafts extending axially at the exteriors of the powerplants, a gear fixed on each axial shaft and meshing with the gears on the power shafts of adjacent powerplants, a propeller, and a drive between said axial shafts and the propeller.

15. Propulsion means for aircraft comprising a plurality of internal combustion turbine powerplants each including an outlet for hot gases under pressure and a plurality of circumferentially spaced power shafts extending laterally from the powerplant, shafts extending axially at the exteriors of the powerplant, and a gear fixed on each axial shaft and meshing with the gears on the power shafts of adjacent powerplants, overrunning clutches interposed in the radial shafts of at least certain of said powerplants, a propeller, and a drive between said axial shafts and the propeller.

NATHAN C. PRICE.

REFERENCES CITED

The following references are of record in the file of this patent:

UNITED STATES PATENTS

| Number | Name | Date |
|---|---|---|
| 1,564,972 | Pearson | Dec. 8, 1925 |
| 1,747,334 | Sundstedt | Feb. 18, 1930 |
| 2,280,835 | Lysholm | Apr. 28, 1942 |
| 2,293,279 | Chilton et al. | Aug. 18, 1942 |
| 2,326,072 | Seippel | Aug. 3, 1943 |
| 2,326,860 | Hunter et al. | Aug. 17, 1943 |
| 2,423,183 | Forsyth | July 1, 1947 |

FOREIGN PATENTS

| Number | Country | Date |
|---|---|---|
| 495,469 | Great Britain | Made Public 1938 |
| 586,558 | Great Britain | Mar. 24, 1947 |
| 593,403 | Great Britain | Oct. 16, 1947 |
| 386,615 | France | Apr. 15, 1908 |
| 723,176 | France | Jan. 12, 1932 |
| 334,519 | Germany | Mar. 17, 1921 |
| 327,929 | Italy | July 20, 1935 |
| 99,860 | Sweden | Sept. 17, 1940 |

OTHER REFERENCES

Publication "Aviation News," October 8, 1945, pp. 20 and 22.